United States Patent
Lin et al.

(10) Patent No.: US 11,445,240 B2
(45) Date of Patent: Sep. 13, 2022

(54) QUERY PROCESSING IN DATA ANALYSIS

(71) Applicant: Microsoft Technology Licensing, LLC, Redmond, WA (US)

(72) Inventors: Qingwei Lin, Redmond, WA (US); Jian-Guang Lou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/109,701

(22) Filed: Dec. 2, 2020

(65) Prior Publication Data

US 2021/0092477 A1 Mar. 25, 2021

Related U.S. Application Data

(63) Continuation of application No. 16/345,662, filed as application No. PCT/US2017/057067 on Oct. 18, 2017, now abandoned.

(30) Foreign Application Priority Data

Oct. 26, 2016 (CN) .......................... 201610968389.8

(51) Int. Cl.
*H04N 7/18* (2006.01)
*H04N 21/4363* (2011.01)
(Continued)

(52) U.S. Cl.
CPC ... *H04N 21/4363* (2013.01); *H04N 21/23406* (2013.01); *H04N 21/4302* (2013.01)

(58) Field of Classification Search
CPC ......... H04N 21/4363; H04N 21/23406; H04N 21/4302; G06F 16/24549; G06F 16/24535; G06F 16/278; G06F 16/283
See application file for complete search history.

(56) References Cited

U.S. PATENT DOCUMENTS 7,689,236 B2 * 3/2010 Matero ................. H04W 48/12
455/506
2002/0059621 A1 * 5/2002 Thomas ............. H04N 21/2187
725/87

(Continued)

FOREIGN PATENT DOCUMENTS

CN 1588358 A 3/2005
CN 1809826 A 7/2006
(Continued)

OTHER PUBLICATIONS

"Office Action Issued in European Patent Application No. 17791881. 0", dated May 3, 2021, 4 Pages.
(Continued)

*Primary Examiner* — Michael B. Pierorazio

(57) ABSTRACT

In implementations of the subject matter described herein, a solution for query processing is provided. In this solution, data subsets are pre-stored for example in a fast access storage device for data analysis, each including data entries corresponding to one or more dimensions. If two or more data subsets are needed to cover target dimensions corresponding to query items in a received query, instead of turning to analyze a source data set that is not stored, the query is decomposed into subqueries. By means of the decomposing, the target dimension(s) corresponding to the query item(s) in each subquery can be covered by a single data subset. The data subset is analyzed for each subquery and a query result for the query is determined based on analysis results of the subqueries. In such way, the query result for the query can obtained in a fast manner from the available data subsets.

20 Claims, 7 Drawing Sheets

(51) Int. Cl.
  *H04N 21/234* (2011.01)
  *H04N 21/43* (2011.01)

(56) References Cited

U.S. PATENT DOCUMENTS

| | | | |
|---|---|---|---|
| 2005/0033741 A1 | 2/2005 | Dombroski et al. | |
| 2007/0124775 A1* | 5/2007 | DaCosta | H04N 21/8352 725/62 |
| 2007/0157281 A1* | 7/2007 | Ellis | H04N 7/17309 725/134 |
| 2008/0022330 A1* | 1/2008 | Barrett | H04N 21/4583 725/89 |
| 2008/0134256 A1* | 6/2008 | DaCosta | H04N 21/43615 725/62 |
| 2008/0155615 A1* | 6/2008 | Craner | H04N 21/4751 725/91 |
| 2008/0201754 A1* | 8/2008 | Arling | H04N 21/47202 725/114 |
| 2008/0235733 A1* | 9/2008 | Heie | H04N 7/17318 725/46 |
| 2010/0031295 A1* | 2/2010 | Krzyzanowski | H04L 12/2816 725/52 |
| 2010/0332590 A1* | 12/2010 | Minakuchi | H04N 7/173 709/203 |
| 2011/0314491 A1* | 12/2011 | Delidais | H04N 21/4348 725/23 |
| 2012/0158531 A1* | 6/2012 | Dion | H04N 21/4758 705/26.1 |
| 2012/0227080 A1* | 9/2012 | Endo | H04N 21/47217 725/115 |
| 2014/0068654 A1* | 3/2014 | Marlow | G06F 16/532 725/28 |
| 2016/0173937 A1* | 6/2016 | Shih | H04N 21/436 725/37 |

FOREIGN PATENT DOCUMENTS

| | | |
|---|---|---|
| CN | 102682118 A | 9/2012 |
| CN | 103229162 A | 7/2013 |
| CN | 105468651 A | 4/2016 |

OTHER PUBLICATIONS

"First Office Action and Search Report Issued in Chinese Patent Application No. 201610968389.8", dated Jun. 30, 2021, 15 Pages.

Aibo, et al., "Research on Storage and Query of Large-Scale Multidimensional Data", In Journal of Computer Engineering and Applications, vol. 52, Issue 13, Apr. 5, 2016, pp. 25-31.

"Office Action Issued in European Patent Application No. 17791881.0", dated Aug. 16, 2021, 9 Pages.

"Data Modeling: PowerDesigner 15.3", Retrieved From: https://manualzz.com/doc/24046947/powerdesigner-15.3, Nov. 30, 2010, 143 Pages.

"Second Office Action Issued in Chinese Patent Application No. 201610968389.8", dated Nov. 24, 2021, 12 Pages.

* cited by examiner

202

| YEAR (210) | BRAND (250) | SALES (270) |
|---|---|---|
| 1/1/2011 | BRAND1 | 4745859 |
| 1/1/2010 | BRAND1 | 2566994 |
| 1/1/2012 | BRAND1 | 2400000 |
| 1/1/2011 | BRAND1 | 1891245 |
| 1/1/2011 | BRAND1 | 1869914 |
| 1/1/2011 | BRAND1 | 1755033 |
| 1/1/2011 | BRAND1 | 1715255 |
| 1/1/2011 | BRAND1 | 1701434 |
| 1/1/2011 | BRAND1 | 1655075 |
| 1/1/2011 | BRAND1 | 1652350 |

204

| CPU (220) | OS (230) | RESOLUTION (260) |
|---|---|---|
| ARM | Android | 1024 x 600 |
| ARM | Linux | 600 x 800 |
| ARM | Android | 1024 x 600 |
| ARM | Linux | 600 x 800 |
| ARM | Linux | 600 x 800 |
| ARM | Linux | 600 x 800 |
| ARM | Linux | 600 x 800 |
| ARM | iOS | 1024 x 768 |
| ARM | Linux | 600 x 800 |
| ARM | Linux | 600 x 800 |

206

| OS (230) | REGION (240) | BRAND (250) | RESOLUTION (260) |
|---|---|---|---|
| Android | USA | BRAND1 | 1024 x 600 |
| Linux | USA | BRAND1 | 600 x 800 |
| Android | USA | BRAND1 | 1024 x 600 |
| Linux | USA | BRAND1 | 600 x 800 |
| Linux | USA | BRAND1 | 600 x 800 |
| Linux | USA | BRAND1 | 600 x 800 |
| Linux | USA | BRAND1 | 600 x 800 |
| iOS | USA | BRAND1 | 1024 x 768 |
| Linux | USA | BRAND1 | 600 x 800 |
| Linux | USA | BRAND1 | 600 x 800 |

208

| CPU (220) | OS (230) | REGION (240) |
|---|---|---|
| ARM | Android | USA |
| ARM | Linux | USA |
| ARM | Android | USA |
| ARM | Linux | USA |
| ARM | Linux | USA |
| ARM | Linux | USA |
| ARM | Linux | USA |
| ARM | iOS | USA |
| ARM | Linux | USA |
| ARM | Linux | USA |

FIG.2B

QUERY PROCESSING IN DATA ANALYSIS

CROSS-REFERENCE TO RELATED APPLICATION

This application is a continuation of U.S. patent application Ser. No. 16/345,662, filed Apr. 26, 2019, which was the National Stage of International Application PCT/US2017/057067, filed Oct. 18, 2017, which claims benefit of Chinese Patent Application No. 201610968389.8, filed Oct. 26, 2016, which applications are hereby incorporated by reference. To the extent appropriate, a claim of priority is made to each of the above disclosed applications.

BACKGROUND

Data analysis or data exploration is becoming increasingly important in data mining, business intelligence and other applications. A user can submit a query to the data analysis platform for various aspects (dimensions) of data and a query processing tool explores and analyzes the data and returns a query result to the user. Since the query of the user may be related to various dimensions of the data, the query processing tool is required to be able to extract insights from the data across the dimensions and mine information behind the data. Online Analytical Processing (OLAP) techniques can be applied to perform data analysis.

Most of the data analysis tasks are time-sensitive and are expected to obtain query results in a more prompt way. For example, there are many use scenarios with interactive data exploration, where users may expect to make a decision depending on the result of the last query and then initiate a next query so that a final decision can be made based on a number of queries. If the query processing tools are not able to provide the results quickly, their availabilities are greatly reduced. With the growth of available data sources in current information era, data is everywhere and increases both in both quantity and dimensionality. Facing with such massive data, it becomes a challenge for data analysis to provide more prompt and accurate results for user queries.

SUMMARY

In accordance with implementations of the subject matter described herein, a solution for query processing is provided. In this solution, data subsets are pre-stored for example in a fast access storage device for data analysis, each including data entries corresponding to one or more dimensions. If two or more data subsets are needed to cover target dimensions corresponding to query items in a received query, instead of turning to analyze a source data set that is not stored, the query is decomposed into subqueries. By means of the decomposing, the target dimension(s) corresponding to the query item(s) in each subquery can be covered by a single data subset. The data subset is analyzed for each subquery and a query result for the query is determined based on analysis results of the subqueries. In such way, the query result for the query can obtained in a fast manner from the available data subsets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A and 2B illustrate schematic diagrams of example source data set and data subset;

Throughout the drawings, the same or similar reference symbols refer to the same or similar elements.

DETAILED DESCRIPTION

Figure 1:
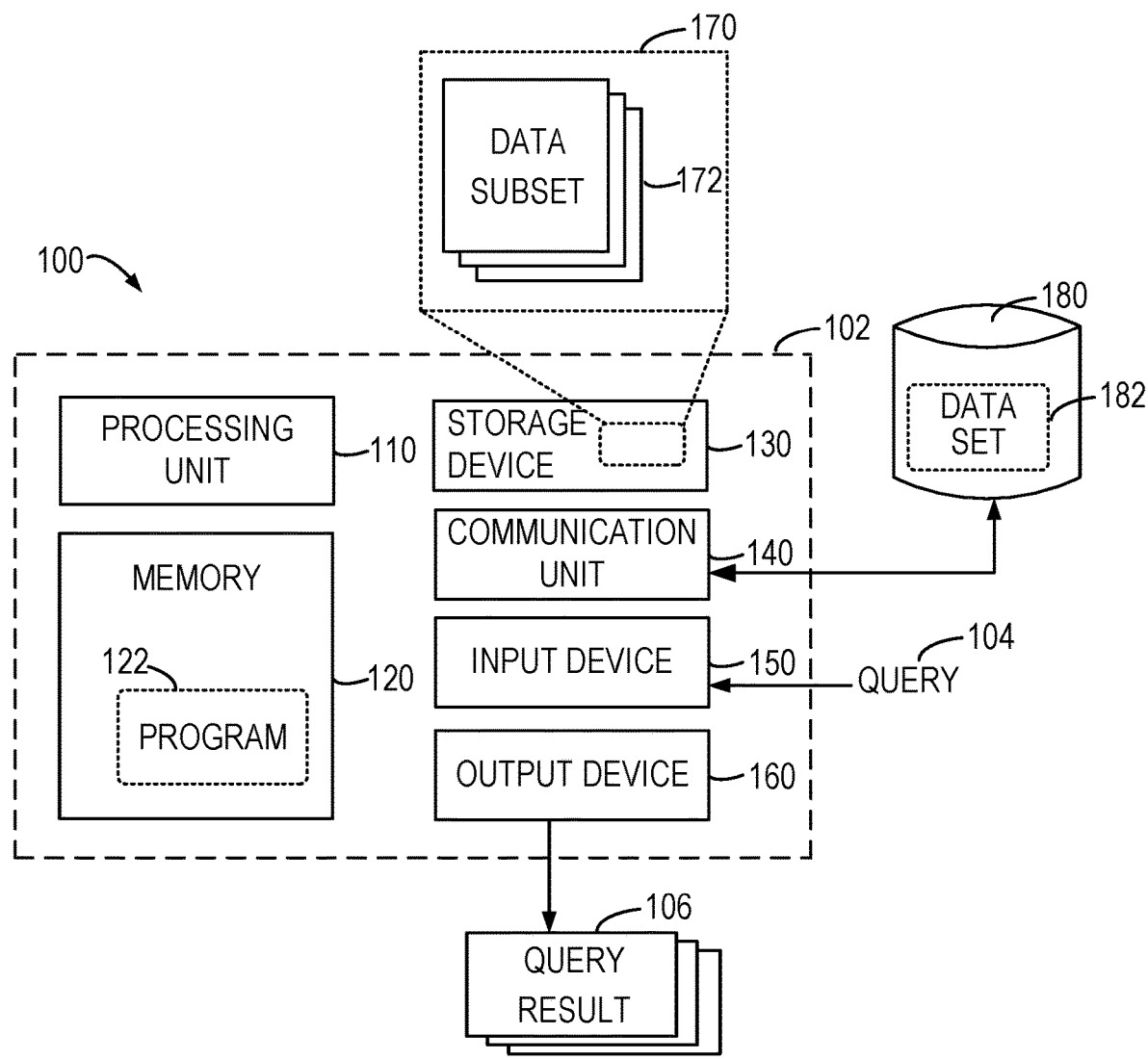
FIG. 1 illustrates a block diagram of a computing environment in which implementations of the subject matter described herein can be implemented.

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, the term "data record" or "data entry" refers to data related to one or more dimensions in a data set or data subset. The term "dimension" is related to an aspect of a data entry and is used to group different types of data in a data set or data subset. For example, in a data set associated with product sales, a data entry may include various data associated with the product name, product parameters, manufacture time, sales time, sales region, and sales volume, where the product name, product parameters, manufacture time, sales time, sales region and sales volume refer to six different dimensions of the data entry. In some cases, data items across two or more of all dimensions may also define a data entry even though this data entry is not related to all dimensions. Different dimensions sometimes can be called as different columns of the data set or data subset, and data or a data entry with multiple dimensions can be called as "multi-dimensional data" or "a multi-dimensional data entry".

As used herein, the term "data item" refers to data related to a certain dimension of a data entry. For example, data recorded in the product name dimension of the data entry can be regarded as a data item. The data item in one dimension can also be regarded as a value of the dimension. Generally speaking, a data item can be categorical, ordinal, or numerical data. For instance, data items in the dimension of "product name" are categorical data, referring to different products; data items in the dimension of "manufacture time" and "sales time" are ordinal data; and data items in the dimension of "sales volume" indicates quantitative properties related to statistics and thus are numerical data. The term "query item" refers to a data item specified in a query and thus is associated with a certain dimension of the data entry.

A data set may be stored in databases or file systems in distributed manner, and thus the access speed to the data items therein is low. Since the data available for analysis is large in size (at TB or PB level) and high in dimensionality (tens of dimensions), some solutions have been proposed to store the data set in a fast access storage device such as a memory to facilitate data analysis tasks for a user query. Examples of such data set store may include a computing architecture SparkSQL in a distributed memory. By improving the access speed, the speed for retrieving the query result is accelerated and the processing time is reduced from days to hours or minutes. However, the processing time can hardly be further reduced because scanning such a data set with a large data size and high dimensionality is time-consuming. It cannot therefore satisfy the performance (e.g., a response time of ten or several seconds) required by time-sensitive tasks such as interactive data exploration.

Some other solutions attempt to divide a large source data set into a plurality of small data subsets to solve the problem of interactive exploration of big data. The small data subsets each cover one or more of the dimensions of the source data set and thus have much small sizes. A data subset sometimes can be created as a so-called data cube, which may be represented by a table of aggregated results of one or more of the columns in the source data set. A query processing device, in response to a request of a query, determines target dimensions corresponding to one or more query items in the query and directly performs data analysis in a single data subset covering the determined target dimensions to compute a query result. Due to the reduction of the data size and the dimensionality, a small number of data scanning operations are needed, thereby reducing the time for obtaining the query result. Instead of storing in a distributed manner as the source data set, the data subsets can be stored in a fast access storage device, which further improves the performance.

However, creating, storing and maintaining data subsets or data cubes all consume computing and storage resources. For example, for a source data set with d dimensions, $2^d$ data subsets in total are generated in order to cover different combinations of the d dimensions, which is impractical in most cases. In order to reduce dimension combinations, some query processing platforms allow the users to manually divide the dimensions of the source data set into groups and create data subsets only based on dimensions in the respective groups. Since not all combinations of the d dimensions are included in the created data subsets, the query processing platforms cannot provide query results for queries with query items related to dimensions that are divided in two or more data subsets.

For example, if a source data set covers the product name, product parameters, manufacture time, sales time, sales region, and sales volume and is divided into two data subsets, where one is related to the product name and product parameters, and the other is related to the manufacture time, sales time, sales region, and sales volume. When a user wants to query about a sales trend of a given product, the query processing platforms cannot give a query result because the two dimensions related to the query (the product name and sales volume) are not included in a single data subset. In this case, the query processing platforms turn to access and analyze the source data set, which takes a longer processing time compared to the analysis based on a data subset.

Further, because of the fact that users generally cannot determine accurately which dimensions of data should be better combined to facilitate subsequent analysis, the manual grouping by the users result in the created data subsets being unsuitable for accurately and quickly computing query results, which therefore degrades the overall performance. In addition, due to the limitation on storage space, the selection by the users and the generation of the data subsets are generally limited based on conservative estimates, so as to prevent the total data size of the generated data subsets from exceeding the available storage space. All of the above makes it impossible to rapidly respond to various queries in subsequent stages.

Some other solutions aim to compromise accuracy of the query results for a faster response speed and less storage space. These solutions are so called Approximate Query Processing (AQP). AQP-based query processing is based on such an assumption that users are generally satisfied with approximate results or answers. For example, users who expect to conduct a survey on the sales trend pay less attention to the accurate sales volumes in a particular time period. Traditional AQP methods include sampling, creating histograms, wavelets, and sketches. Irrespective of data cubes, an AQP method creates a set of stratified samples on the original data set, and selects the most appropriate samples for data analysis of a query during operation. The set of stratified samples is determined by taking historical workloads, data sparseness, and storage limits into consideration. Although effective in terms of providing query results, the method is faced with the "cold start" problem. Since the method relies heavily on historical workloads, it is not applicable for newly imported data because there are no historical workloads.

As can be seen from the above analysis, the existing solutions have various defects in aspects of both creating data subsets and estimating query results. To at least partially address the above problems and other potential problems, a new query processing solution is provided. As briefly described above, according to implementations of the subject matter described herein, if two or more of data subsets are needed to cover target dimensions corresponding to a plurality of query items in a received query, the query is decomposed into a plurality of subqueries. Each subquery has at least one of the query items, so the target dimension(s) corresponding to query item(s) of each subquery can be covered by a single data subset. Analysis results of the respective subqueries are determined by analyzing corresponding data subsets and can be aggregated (for example, through probability analysis) for estimating a final query result for the query. Compared with the query result determined from the source data set covering all the target dimensions corresponding to the plurality of query items, the estimated query result may be degraded in accuracy, but can be obtained in a fast way and in real time based on the available data subsets. Furthermore, no prior knowledge of data distribution and historical workloads are required for the estimate of the query result.

Basic principles and various example implementations of the subject matter described herein will now be described with reference to the drawings. FIG. 1 illustrates a block diagram of a computing environment 100 in which implementations of the subject matter described herein can be implemented. It would be appreciated that the computing environment 100 described in FIG. 1 is merely for illustration and not limit the function and scope of implementations of the subject matter described herein in any manners.

As shown in FIG. 1, the computing environment 100 includes a computing system/server 102 in form of a general computer device and a data set 180. The computing system/server 102 can be implemented as a query processing device (hereinafter referred to as "query processing device 102") according to implementations of the subject matter described herein. The computing system/server 102 receives queries and provides query results 106. Components of the computing system/server 102 include, but are not limited to, one or more processors or processing units 110, a memory 120, a storage device 130, one or more communication units 140, one or more input devices 150, and one or more output devices 160. A processing unit 110 can be a physical or virtual processor and can execute various processes based on the programs stored in the memory 120. In a multi-processor system, multiple processing units execute computer-executable instructions in parallel to improve the parallel processing capacity of the computing system/server 102.

The computing system/server 102 typically includes a plurality of computer storage media, which can be any available media accessible by the computing system/server 102, including but not limited to volatile and non-volatile media, and removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 120 includes one or more program products 122 having one or more sets of program modules configured to perform functions of various implementations described herein.

The storage device 130 can be any removable or non-removable media and may include machine-readable media, such as a memory, flash drive, disk, and any other media, which can be used for storing information and/or data 170 (for example, one or more data subsets 172) and accessed in the computing system/server 102. In some implementations, the data subsets 172 can be stored together with the program products 122 in the fast-access memory 120 instead of in the storage device 130. Alternatively, the storage device 130 can be implemented as a memory that is accessible in a fast way. It is to be understood that the above description is merely by way of example and the data subsets 172 may also be stored in a memory of any appropriate form. In one example, the data subsets 172 may be stored in a number of distributed storage devices.

The computing system/server 102 may further include additional removable/non-removable, volatile/non-volatile memory media. Although not shown in FIG. 1, a disk drive is provided for reading and writing a removable and non-volatile disk and a disc drive is provided for reading and writing a removable non-volatile disc. In such case, each drive is connected to the bus (not shown) via one or more data media interfaces.

The communication unit 140 communicates with a further computing device via communication media. Additionally, functions of components in the computing system/server 102 can be implemented by a single computing cluster or multiple computing machines connected communicatively for communication. Therefore, the computing system/server 102 can be operated in a networking environment using a logical link with one or more other servers, network personal computers (PCs) or another general network node.

The input device 150 may include one or more input devices, such as a mouse, keyboard, tracking ball, voice-input device, and the like. The output device 160 may include one or more output devices, such as a display, loudspeaker, printer, and the like. As required, the computing system/server 102 can also communicate via the communication unit 140 with one or more external devices (not shown) such as a storage device, display device and the like, one or more devices that enable users to interact with the computing system/server 102, or any devices that enable the computing system/server 102 to communicate with one or more other computing devices (for example, a network card, modem, and the like). Such communication is performed via an input/output (I/O) interface (not shown).

In FIG. 1, the storage device 130 is stored with data 170 which includes data subsets 172 (e.g., statistical data related to product sales). As a query processing device, the computing system/server 102 may receive a query 104 for example from a user through the input device 150. For instance, the query may relate to the sales of a given particular product in a certain region. The query processing device 102 determines a query result 106 based on the stored data subsets 172. The query result 106 can be represented in a form of graphic, table, text, audio, video, or any combination thereof, so that the user or other receiver can be informed of the query result. It is to be understood that the query result 106 can be represented in any appropriate form, and the above form(s) is merely given as an example without limitation to the scope of the subject matter described herein.

The query processing device 102 can further communicate with a database 180 storing a data set 182 via a communication unit 14. The data set 182 includes multiple data entries corresponding to multiple dimensions and may be a source data set of the data subsets 172. A data subset 172 is generated based on the data set 182 and includes data entries corresponding to one or more dimensions of the data set 182. If the query result 106 cannot be directly provided based on the data subsets 172, the query processing device 102 may access the data set 182 as required to perform data analysis in a wider range of data.

Figure 2A:
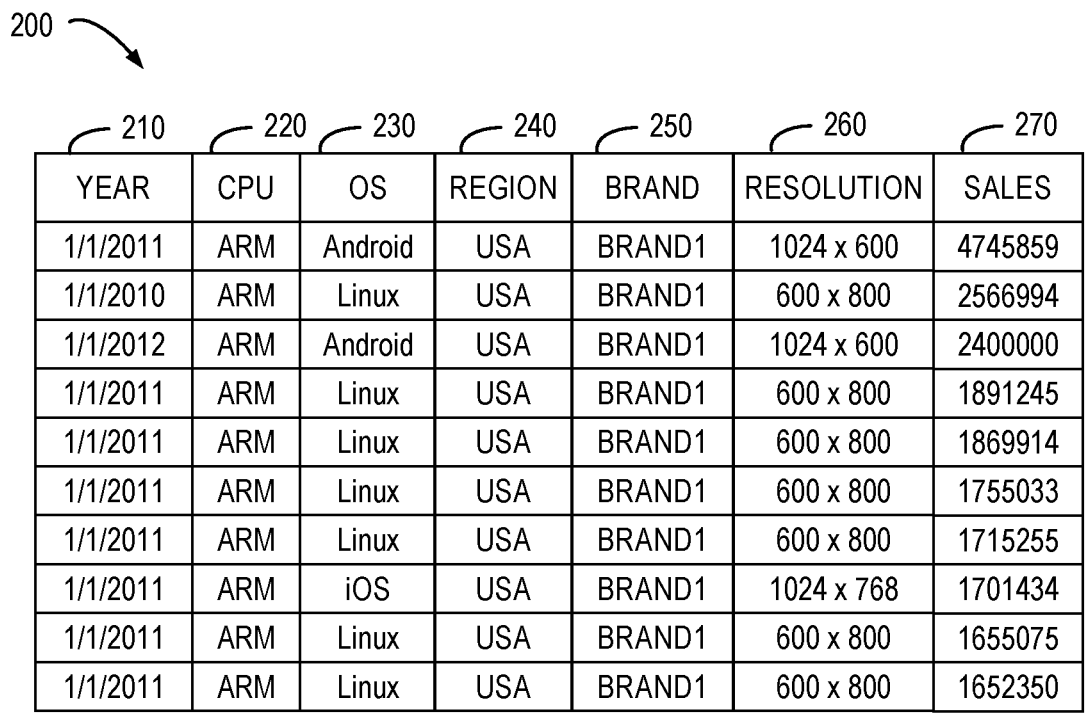

Implementations of the subject matter described herein are further described by way of detailed examples. FIG. 2A illustrates a schematic diagram of a source data set 200 according to an implementation of the subject matter described herein. The data set 200 may be implemented as the data set 182 in the database 180 of FIG. 1. Although the data set 200 is shown in FIG. 2A in form of a multidimensional table, it would be appreciated that the data set 200 is provided for the purpose of illustrating the following descriptions of examples and the data set 200 may be in any suitable forms and includes any contents. The scope of the subject matter described herein is not limited by the example in FIG. 2A.

In some implementations, the data set 200 may be a single table, a Comma Separated Value (CSV) file, or a file in any other suitable form stored in the database, or can be obtained by joining a number of tables. In the example of FIG. 2A, the data set 200 is a table of product sales, including multiple rows and columns. Every data entry is shown in one row of the table, and columns of "Date" 210, "CPU" (Central Processing Unit) 220, "OS" (Operating System) 230, "Region" 240, "Brand" 250, "Resolution" 260, and "Sales" 270 are different dimensions of the data set 200. Data corresponding to one dimension in each data entry is referred to as a data item or dimension value, which is defined by a row and a column of the data set 200 jointly.

Since data of the data set 200 is huge in size and high in dimensionality, a plurality of data subsets are pre-created for the data set 200. Each data subset can include data of one or more dimensions of the seven dimensions shown in FIG. 2A. Therefore, the data size of each data subset is reduced and each data entry therein includes data of less dimensions. For example, four data subsets 202 to 208 are generated as illustrated in FIG. 2B based on the data set 200 and cover the following dimensions {210, 250, 270}, {220, 230, 260}, {230, 240, 250, 260}, and {220, 230, 240}, respectively. These data subsets and the data set 200 can be separately stored and implemented as the data subsets 172 in the storage device 130 of FIG. 1.

Figure 3:
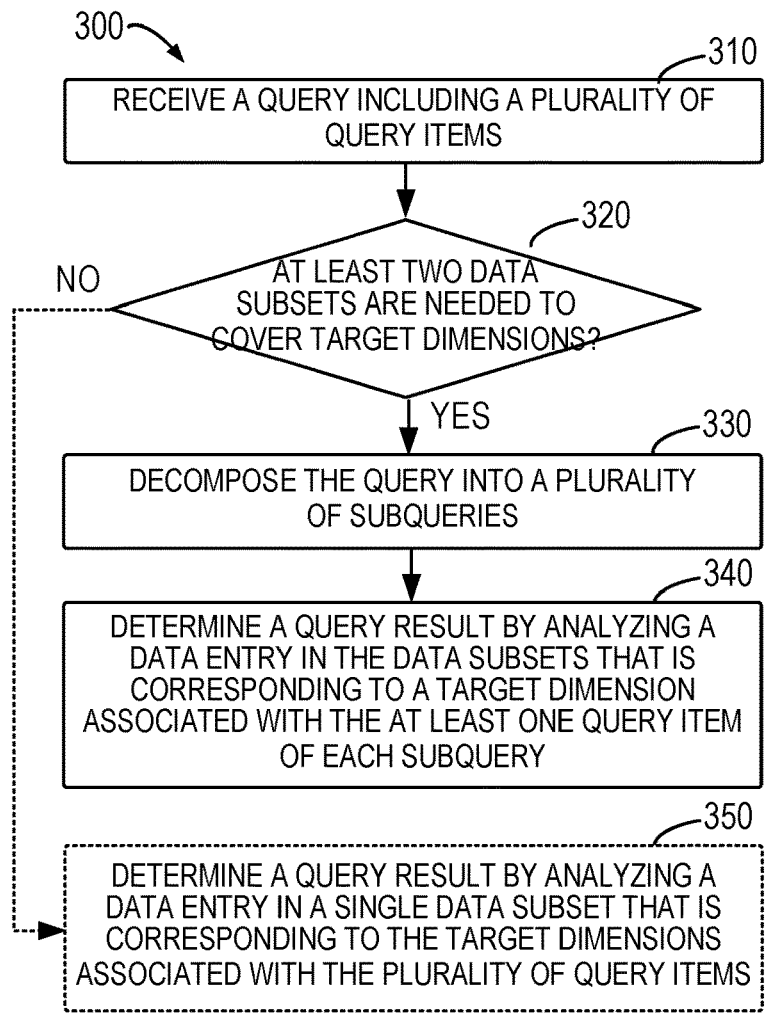
FIG. 3 illustrates a flowchart of a process of query processing in accordance with an implementation of the subject matter described herein.

FIG. 3 illustrates a flowchart of a process of query processing 300 in accordance with an implementation of the subject matter described herein. The process 300 can be implemented at the query processing device 102. At 310, the query processing device 102 receives a query 104 including a plurality of query items. The plurality of query items are associated with a plurality of target dimensions of data entries and indicate different aspects of expected information. The query 104 may input by a user or generated by other ways. For example, the query 104 may be "SELECT SUM (sales) WHERE CPU='ARM' AND OS='iOS' AND BRAND='Brand1' AND REGION='US'", which is associated with dimensions of "Sales" 270, "CPU" 220, "OS" 230, "Brand" 250 and "Region" 240 in the data set 200 of FIG. 2A. The associated dimensions are referred to as target dimensions and data defined for the target dimensions of the query 104 are query items, which indicate that user expects to obtain sales of the product when its CPU is ARM, OS is iOS, Brand is Brand 1, and Region is in US.

At 320, the query processing device 102 determines whether at least two of a plurality of data subsets are needed to cover the plurality of target dimensions. The query processing device 102 stores the plurality of data subsets generated from a source data set into the storage device 130 (with fast access). In order to obtain an accurate query result, it would be desirable that one stored single data subset can cover the target dimensions associated with the current query items and is used as the basis for data analysis of the query. "Cover" used herein means that data corresponding to the target dimensions is included in a single data subset, which may or may not include data of other dimensions.

If no single data subset among the available data subsets can cover the plurality of associated target dimensions, that is, if two or more data subsets are needed to cover all of the target dimensions, according to implementations of the subject matter described herein, the query is decomposed to determine an estimated query result. In the example of FIGS. 2A and 2B, if the query 104 relates to target dimensions of "Sales" 270, "CPU" 220, "OS" 230, "Brand" 250 and "Region" 240, then none of data subsets 202 to 208 stored in the query processing device 102 can separately cover all of the above target dimensions. Accordingly, the query 104 is decomposed.

At 330, the query processing device 102 decomposes the query 104 into a plurality of subqueries, such that each decomposed subquery has at least one of the plurality of query items in the query 104. In some implementations, the plurality of query items in the query 104 are randomly grouped to obtain the query items for each of the subqueries. As the number of query items in each subquery is reduced, the probability of finding a result for each subquery from the available data subsets increases. In other implementations, the decomposing of the query is dependent on the current available data subsets. For example, the query 104 is randomly grouped and if the target dimensions associated with a subquery still requires two or more data subsets to cover, then the subquery is further decomposed. In some implementations, associations of the target dimensions may be created based on coverage of the target dimensions by the data subsets, and the query 104 is decomposed based on the associations so that the target dimension(s) associated with query item(s) in each subquery can be covered by a single stored data subset. The process of query decomposing will be described in details below.

At 340, the query processing device 102 determines a query result for the query 104 by analyzing a data entry or data entries in the plurality of data subsets that is corresponding to a target dimension(s) associated with the query item(s) in each subquery. When the target dimensions associated with each subquery can all be covered by a single data subset, data analysis is performed on the single data subset to provide an analysis result for the subquery. At this time, the query result is determined by employing various known analytical techniques that are used for providing results for queries. Other analytical techniques are also applicable. The analysis results of the plurality of subqueries can be aggregated to determine the query result for the query 104. Probability analysis methods can be adopted to estimate the query result for the query 104. An example of the probability analysis method is to estimate a query result satisfying all variables (query items) of the query 104, given the analysis results of a single variable (query item) and/or various combinations of several variables in the query 104. Various probability analysis methods can be utilized for the estimation.

If the query processing device 102 determines that the associated target dimensions can be covered by a single available data subset rather than a plurality of data subsets, at 350, the query result for the query 104 is determined by analyzing data entries corresponding to the target dimensions in that single data subset. Then an accurate result for the query 104 can be provided. A variety of known analytical techniques for providing a result of a query can be employed.

Various example implementations for the decomposing of the query 104 are described in detail below. It would be appreciated that query decomposing involves reducing the query 104 of high dimensionality (with more query items) to subqueries of low dimensionality (with less query items). The reasons why the query result for the query 104 can be determined based on the above decomposing are based on the following facts as recognized by the inventors.

First, the correlations between dimensions (or columns) of a data set is not high. In many experiments in machine learning using for example a Naïve Bayesian Network, when it is supposed that all the features are independent with each other, it is still possible to produce surprisingly good results. Furthermore, in a learning model based on for example a Tree Augmented Naïve Bayesian Network, it is supposed that each feature is dependent on at most one other feature and can still obtain good results. Based on these observations, the inventors have discovered that it is feasible to reduce dimensionality of the query 104.

Second, during practical use cases, data entries are sparse in a big data set (for example, some data entries have null values in certain dimensions), so it is hard to directly provide a result for a query with high dimensionality. For this reason, meaningful results can only be obtained on the basis of query decomposing. In addition, the query process becomes more effective by generating and storing a plurality of data subsets of low dimensionality. Further, as mentioned above, users are generally satisfied with approximate results or answers during data analysis and mining.

Based on the above facts, implementations of the subject matter described herein propose a solution for decomposing a query to provide an estimated query result based on the available data subsets. A process 400 of decomposing the query 104 is described below with reference to FIG. 4. It would be appreciated that the process of decomposing 400 is a specific implementation of the process 300 in FIG. 3 and thus can also be implemented by the query processing device 102. In order to make the query result for the query 104 more accurate in the case where it is impossible to find all the target dimensions in a single data subset, according to the probability analysis theory, it is desired to find out as many analysis results for different combinations of the query items in the query 104 as possible. Therefore, different combinations of the query items during the query decomposing.

In general, the process 400 of decomposing the query 104 is dependent on two factors. One of the factors is the coverage of the target dimensions by the currently stored data subsets, as mentioned above. The other factor is correlations between the query items in the query 104 (the data items inquired by the query in the respective target dimensions). When considering the correlations, it does not simply take the overall correlation between the concerned target dimensions into consideration, but uses correlations between the data items that are currently inquired in the target dimensions.

The decomposing process 400 aims to determine associations between the target dimensions based on known information and decompose the query 104 based on the associations. The two factors mentioned above may be considered in determining the associations. Specifically, at 410, the query processing device 102 determines correlations between respective pairs of query items among the plurality of query items of the query 104. At 420, the query processing device 102 determines associations of the plurality of target dimensions based on the correlations and target dimensions corresponding to the respective data subsets. The determining of the correlations and associations will be described below.

In some implementations, associations of the target dimensions are generated based on a Bayesian Network and thus may be represented by a Directed Acyclic Graph (DAG). The target dimensions may be regarded as vertices of the DAG and a correlation between query items corresponding to two target dimensions may be considered as a weight of an edge between two vertices. Accordingly, compared with the conventional Bayesian Networks, the Bayesian Network generated in the implementations of the subject matter described herein is bound by conditions (that is, under the constraint of the query items of a given query and the target dimensions of given data subsets). Therefore, the Bayesian Network proposed herein is also referred to as a Conditional Bayesian Network or Dynamic Bayesian Network.

Figure 5:
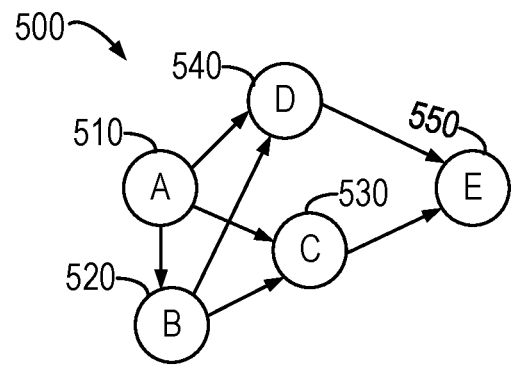
FIG. 5 illustrates a schematic diagram of associations of target dimensions in accordance with an implementation of the subject matter described herein.

FIG. 5 shows an example DAG 500 to provide a visual representation of associations of target dimensions represented by a DAG. In this example, it is supposed that the query 104 is related to five target dimensions, including A 510, B 520, C 530, D 540, and E 550, which are represented as vertices of the DAG 500, respectively. In the DAG 500, a weight of an edge between each two vertices is represented by a correlation between a pair of query items corresponding to the target dimensions. It will be discussed in the following how to add an edge into the DAG 500.

Compared with conventional Bayesian algorithms based on static information theory, the Bayesian network proposed herein uses correlations between query items assigned to the dimensions instead of computing column-wise (dimension-wise) mutual information. This is based on the recognition that correlations between the dimensions are not high, as mentioned above. In some implementations, a correlation between two query items is the mutual information therebetween, which is also referred to as Point-wise Mutual Information (PMI).

In an example, mutual information between two query items is calculated based on probabilities of their presence in respective target dimensions. A probability of presence of each query item in its target dimension refers to a ratio of the number of times a data item matching with (or identical to) the query item present in the dimension to the number of all data items in that dimension, which thus indicates a probability of finding the query item in the target dimension. For example, if the target dimension A has 100 data items and there are 20 data items that are identical to the query item, then the probability of the query item presenting in the dimension A is determined as 0.2.

Based on the probability for each query item, various methods can be used to compute the mutual information. By way of example, it is supposed that the query 104 involves five target dimensions 510 to 550 of {A, B, C, D, E} and query items associated with the respective target dimensions are {a, b, c, d, e}, then the mutual information between the query items a and b (denoted as "PMI (a, b)") is determined as follows:

$$PMI(a, b) = \log\left(\frac{p(a, b)}{p(a) \cdot p(b)}\right) \quad (1)$$

where p(a) and p(b) represents probabilities of presence of the query items a and b in their target dimensions A and B, and p(a, b) represents a probability of co-presence of the query items a and b in both target dimensions A and B. These probabilities may be pre-computed and stored as metadata together with the data subsets, or may be determined by statistics of data entries in the data subsets that include the target dimensions.

For the purpose of comparing with Point-wise Mutual information, the mutual information between two target dimensions A and B (denoted as "I (A, B)") is provided as follows:

$$I(A, B) = \Sigma_a \Sigma_b p(a, b) \log\left(\frac{p(a, b)}{p(a) \cdot p(b)}\right) \quad (2)$$

It can be seen that the mutual information between two target dimensions is actually the weighted average of the PMI between all data items in the two target dimensions. In the case of querying, the relationship between two target dimensions under a specific query can be better described by the PMI. In comparison, the mutual information between two target dimensions is affected by weights of the two target dimension values or mutual information between other irrelevant dimension values, so it cannot reflect the correlation between two target dimensions as accurately as PMI in a given query. For instance, for the target dimensions CPU 220 and OS 230 in the example shown in FIGS. 2A and 2B, if query 104 has two query items CPU="ARM" and OS="Linux", the correlation (PMI) between the two query items is computed as 0.305, which is greater than the mutual information of 0.037 between the dimensions CPU 220 and OS 230 and thus indicates that the dimensions CPU and OS are strongly correlated with the dimension values ARM and Linux given.

In some implementations, when determining the associations of the Bayesian Network for the plurality of target dimensions, the absolute value of PMI may be used as a weight of an edge between vertices of target dimensions. Therefore, even if the two query items are determined as having a strong negative correlation, they are also considered to have an important correlation. It would be appreciated that the correlation for each other pair of query items among the plurality of query items in the query 104 can be likewise determined.

After obtaining correlations between the query items, a DAG can be generated with the target dimensions as vertices to represent their associations. The correlations between the query items can serve as weights of undirected edges between their corresponding target dimensions. In a DAG, an association of two target dimensions can be indicated by a connection edge therebetween. The objective of generating a DAG is to find a Bayesian Network such that the sum of weights for all the edges is maximum and all subqueries decomposed according to the DAG can be directly provided with query results by the available data subsets. Therefore, in addition to the correlations of query items, the coverage of the target dimensions by the stored data subsets may also affects whether two target dimensions in the DAG are associated with one another or not. In general, it is desired that the combinations of any two or more target dimensions having associations are covered by the data subsets. Alternatively, or in addition, it is also desired to generate associations preferably for the corresponding target dimensions of the query items having stronger correlations.

An example process of creating a DAG is described below. The plurality of target dimensions are represented as vertices of the DAG and one of the target dimensions is selected as a root node. The root node is selected to identify directions of edges between the target dimensions, such that the directions are always pointing from parent nodes to child notes. In particular, a correlation larger than the threshold correlation (for example, the maximum correlation) among the computed correlations is determined. Any one of the two target dimensions corresponding to the query items involved with that correlation may be selected as the root node and the two target dimensions are determined as having an association. In the example of FIG. 5, it is supposed that the query items a and b, which are respectively corresponding to the target dimensions 510 and 520, have the strongest correlation. Thus, the target dimensions 510 may be selected as a root node and an edge pointing from the root node 510 to the node 520 represents that there is an association between the two target dimensions.

Further, other target dimensions are selected and it is determined whether edges therebetween can be added into the DAG according to a descending order of the correlations. An edge between two target dimensions is determined to be added or not based on the following criteria.

First, the directions of edge is determined as pointing consistently from up to down or from down to up (using the root node as basis). If the two dimensions are at the same layer, then the direction can be defined as consistently from left to right (or consistently from right to left). The rule for directions of the edges in the DAG is to avoid cycles in the DAG. In addition, a direction can also indicate a relationship of the association between two target dimensions. For example, if a direction points from the dimension A to the dimension B, it means that the association from the dimension B to the dimension A is strong (while the association from A to B may be weak).

Second, the coverage of the target dimensions by the available data subsets is taken into account. Two target dimensions that have an association need to be covered by a single data subset. In addition, if any of the two target dimensions has a further association(s) with one or more other target dimensions, all of these target dimensions are needed to be coved by a single data subset. In one example, the target dimensions, which point to a same target dimension, need to be covered by a single data subset together with the pointed target dimension. In the example of FIG. 5, it is supposed that the target dimensions 510 and 530 have been determined as having an association, all the target dimensions 510, 520, and 530 are needed to be covered by a single data subset when determining if an edge can be added between the target dimensions 520 and 530.

When it has checked whether all the edges can be added, the DAG is created as a Bayesian Network to represent associations between the target dimensions. It would be appreciated that the processing of determining associations above is dynamic. That is, once a query 104 is received, associations of target dimensions corresponding to that query 104 can be generated on the basis of that query. The created Bayesian Network above is bound by certain conditions. Thus, it would be appreciated that even if queries 104 involve the same target dimensions, the DAG may also vary when different query items are associated with the target dimensions.

Figure 6A:
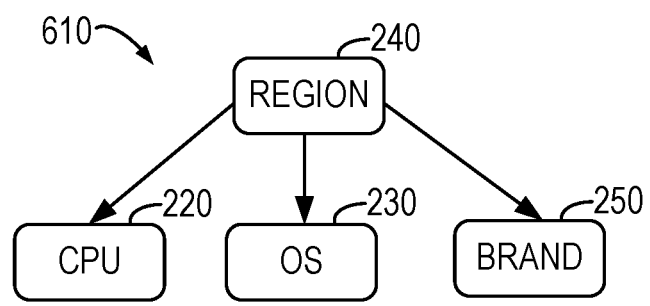
FIGS. 6A and 6B illustrate a schematic diagram of associations of target dimensions for different queries in accordance with an implementation of the subject matter described herein.
Figure 6B:
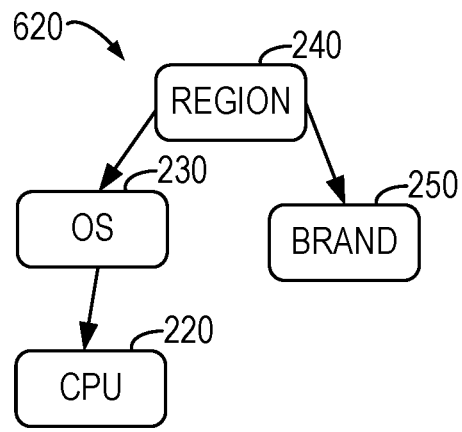

For example, if the query 104 is "SELECT SUM WHERE CPU='ARM' AND OS='iOS' AND BRAND='Brand1' AND 'REGION'='US'", the associations of the target dimensions CPU 220, OS 230, Region 240, Brand 250 and Sales 270 are determined under the conditions of {CPU='ARM' AND OS='iOS' AND BRAND='Brand1' AND 'REGION'='US'}. When the stored data subsets are data subsets 202 to 208 as shown in FIG. 2B, a DAG 610 is generated as illustrated in FIG. 6A. In another example, if the query 104 is "SELECT SUM WHERE CPU='ARM' AND OS='Linux' AND BRAND='Brand1' AND 'REGION'='US'", since different query items are included, a different DAG 620 is generated for the same target dimensions as shown in FIG. 6B.

It would be appreciated that although a DAG in a tree structure has been discussed above, it is not limited to construct and store such tree structure in determining the associations; instead, any other methods that are capable of identifying the associations between the target dimensions can be applied. It would also be appreciated that in addition to the DAG, the associations between the target dimensions can be represented in other forms.

Figure 4:
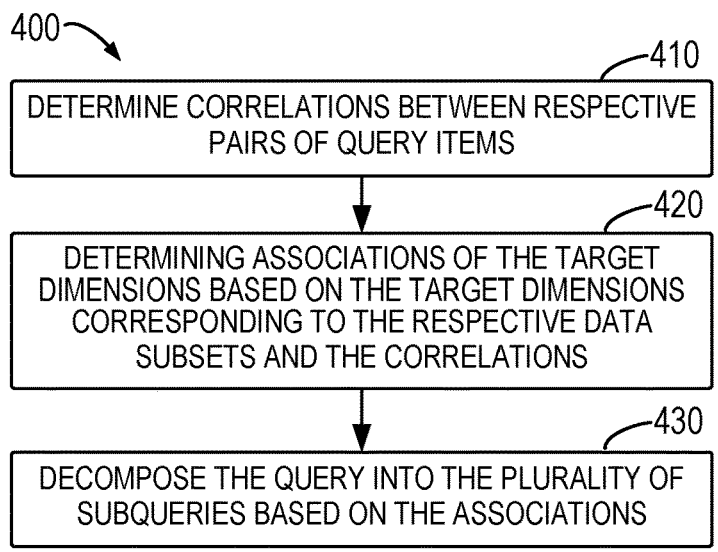
FIG. 4 illustrates a flowchart of process of query decomposing in accordance with an implementation of the subject matter described herein.

Still referring to FIG. 4, in which the query processing device 102 decomposes, at 430, the query into a plurality of subqueries based on the determined association. Each of the subqueries can include one or more of the query items in the query. For subqueries with more than one query item, their corresponding target dimensions are expected to have associations. Two or more target dimensions having associations therebetween may be selected from the DAG of associations created for the target dimensions. The query items corresponding to the selected target dimensions are decomposed into one of the plurality of subqueries. The query items of the plurality of subqueries can be partially overlapped. As can be seen from the above generated associations, the target dimensions associated with each subquery can be covered by one single data subset. In addition, one or some of the plurality of subqueries can have only one query item.

Through the above decomposing procedure, a query result for each subquery (including subquery with one query item) can be provided from a single data subset. Therefore, at the phase of data analysis, the query processing device 102 can analyze data entries of the target dimensions associated with each subquery, and mine the data to obtain an analysis result for the subquery. Various data analytical techniques, either currently known or to be developed in the future, can be employed to perform data mining on a single data subset. The scope of the subject matter described herein is not limited in this regard.

Figure 7:
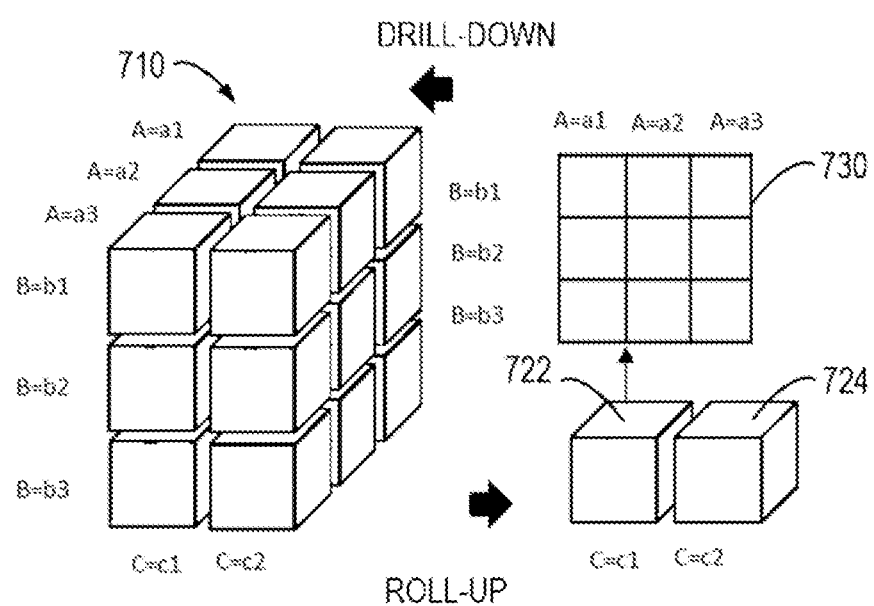
FIG. 7 illustrates a schematic diagram of analysis of a data subset in accordance with an implementation of the subject matter described herein.

In some examples, dependent on the query item(s) in each subquery, the query processing device 102 can perform various Online Analytical Processing (OLAP) operations on the single data subset such as drill-down and roll-up, to perform corresponding analysis tasks. FIG. 7 shows a schematic diagram of drill-down and roll-up operations on a single data subset 710. The illustrated data subset 710 covers three dimensions A, B, and C and each of the three dimensions has respective data items {a1, a2, a3}, {b1, b2, b3} and {c1, c2}. In the roll-up operation, when the data items (dimension values) of the dimension C are given as c1 and c2, two data cubes 722 and 724 can be obtained. After a further roll-up operation on the data cubes 722 and 724, a data table 730 consisting of the dimensions A and B can be analyzed. The drill-down operation is a reverse operation of the roll-up. Data analysis tasks can further include pattern mining such as a trend, unusual values or points, correlations and the like, so as to provide the analysis result for the subquery.

After obtaining the analysis results for the plurality of subqueries of the query 104, the query processing device 102 can determine the final query result for the query 104 through a probability analysis method. In some cases, in order to obtain a more accurate query result for the query 104, as many combinations of the plurality of query items as possible are included in the decomposed subqueries and then the corresponding query results are analyzed. As an example, if the query 104 involves five target dimensions A to E, 510 to 550, as shown in FIG. 5 and is decomposed, based on the associations of FIG. 5, into subqueries related to the following target dimensions: {B 520}, {A 510}, {A 510, E 550}, {B 520, E 550}, {B 520, C 530}, and {A 510, B 520, C 530}, respectively. The probability (denoted as "P (A, B, C, D, E)") that data entries, which satisfy the constraints for the target dimensions 510 to 550 by the query 104, are presented in all data of the source data set can be estimated as:

$$P(A, B, C, D, E) = \frac{p(E, B) \cdot p(B, C) \cdot p(E, A) \cdot p(A, B, C)}{p(B)^2 \cdot p(A)} \quad (3)$$

where P(A, B, C, D, E) represents the probability that all dimension values of A to E, which match data entries of the query items in the query 104, are found in the source data set; p(X1 . . . , Xn) represents a determined probability of presence of query items corresponding to the respective target dimensions X1 to Xn in a single data subset, and n represents an integer equal or greater than 1. If a user needs to search data entries satisfying query item requirements of the query 104, the number of the data entries may be determined by multiplying the estimated probability P(A, B, C, D, E) by the total number of data entries in the source data set (which can be pre-stored as metadata). When the query 104 inquires other information, its query result can be provided according to the probability analysis method accordingly.

It has been described above the solution for estimating a query result based on the available data subsets through query decomposition. As mentioned, the query decomposition is related to the target dimensions covered by the available data subsets. In order to allow the stored data subsets covering more dimension combinations so as to provide accurate or estimated query results for more different queries, implementations of the subject matter described herein provides a solution for generating data subsets from a source data set. This solution can be performed by the query processing device 102 before receiving the query 104 or before generating a query result for the query 104. Hereinafter, dimensions of the source data set are referred to as source dimensions so as to differentiate from the target dimensions associated with query items.

Different from generating the data subsets through the user instructions in traditional solutions, the solution for generating data subsets in the subject matter described herein can automatically generate data subsets under certain constraints. One of the constraints is the requirement for a coverage rate of dimension combinations of the source data set. In the cases where the storage space is limited, an additional constraint on the total data volume of the data subsets to be generated is considered. The above constraints are provided because of the following problems in generating the data subsets. On one hand, in order to obtain a higher coverage rate, some traditional solutions always store a data subset related to all source dimensions of the source data set (which is corresponding to the "source data set") so as to accurately generate query results for all kinds of queries. However, this full-dimensional data subset tends to consume excessive storage space. On the other hand, one characteristic of data subsets, for example, data cubes, is that high-dimensional data subsets can be used to provide query results for low-dimensional queries, but the opposite is not true. This is also the reason why it is desired to increase the coverage rate of dimensions in the data subsets. By generating data subsets under the above constraints, a balance can be achieved between the data storage and the coverage rate of dimensions.

Figure 8:
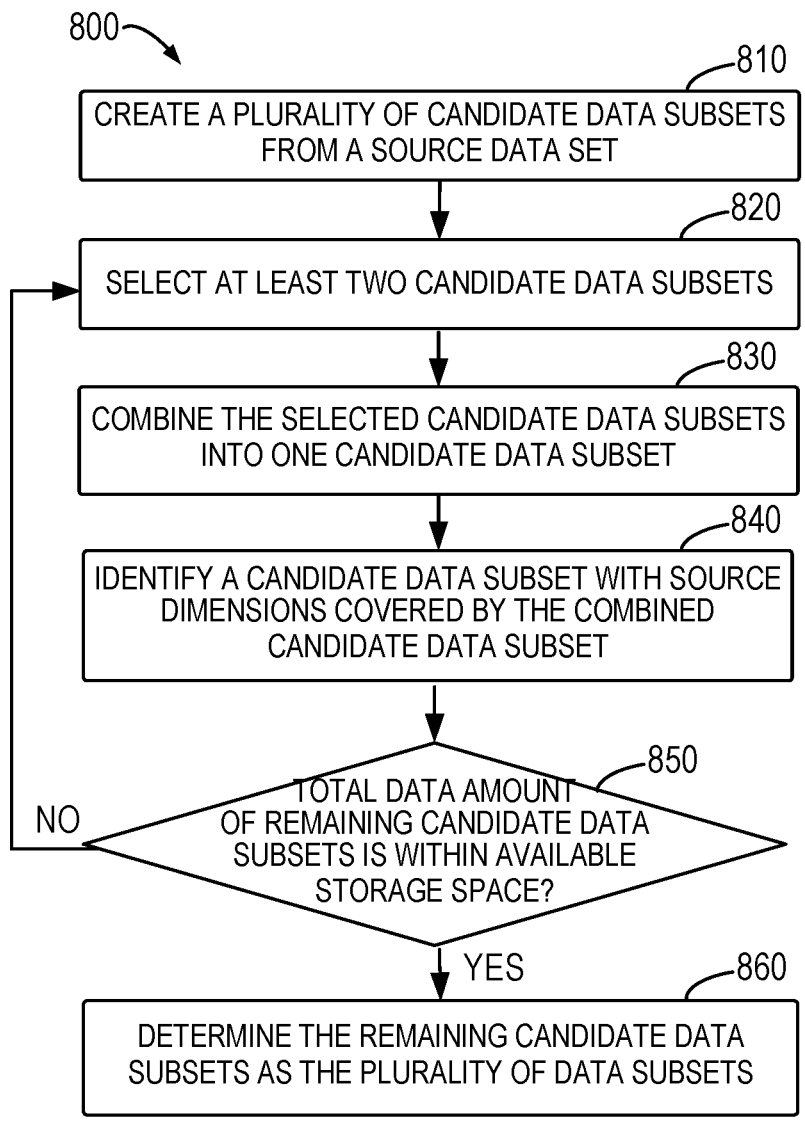
FIG. 8 illustrates a flowchart of a process of generating data subsets in accordance with an implementation of the subject matter described herein.

FIG. 8 illustrates a flowchart of a process 800 for generating data subsets in accordance with an implementation of the subject matter described herein. The process 800 can be implemented at the query processing device 102. At 810, the query processing device 102 creates a plurality of candidate data subsets from a source data set. The data subsets are created based on a predetermined coverage rate for combinations of source dimension of the source data set, such that each of the candidate data subsets covers at least two of the source dimensions.

The predetermined coverage rate for combinations of the source dimension is represented by a ratio of the number of dimension combinations covered by the plurality of candidate data subsets to all combinations of the source dimensions. For example, for the candidate data subsets that are created to cover three source dimensions A, B and C, all combinations of the source dimensions include: Ø, {A}, {B}, {C}, {A, B}, {A, C}, {B, C}, and {A, B, C}. In one implementation of the subject matter described herein, in order to facilitate query decomposing, the predetermined coverage rate includes a coverage rate for the combinations of two of the source dimensions. For example, the predetermined coverage rate can indicate that the plurality of candidate data subsets cover all different combinations of any two of the source dimensions. This is because data entries of two target dimensions are always involved in calculating the correlations of the query items. Under the constraint of the predetermined coverage rate, the plurality of candidate data subsets are first created to each cover two different source dimensions.

It would be appreciated that one or more of the candidate data subsets can also be created to cover more than two or less than two source dimensions. For example, when the predetermined coverage rate for the combinations of two dimensions is below 100%, some of the candidate data subsets can be created to cover a different number of source dimensions. In addition, it is to be noted that instead of directly generating the candidate data subsets, structures of the candidate data subsets are created at 810 (e.g., to determining the covered source dimensions of the data subset) to save computing resources. In some other implementations, the candidate data subsets can also be directly generated from the source data set for subsequent processing.

In some implementations, part of the source dimensions in the source data set, for example, source dimension(s) with high cardinality, can be discarded before the creating candidate data subsets. It has been recognized that some source dimensions such as dimensions of timestamp and identifier always produce high cardinality (that is, have a large amount of different values) in the big data set. Since users pay more attention to summarized data instead of individual values during data analysis and query, source dimensions with high cardinality such as dimensions of timestamp and identifier (if any) in the source data set can be discarded to reduce the total data size.

Since the coverage on the combinations of the source dimensions may not be high (for example, not covering combinations of more than three source dimensions) in the created candidate data subsets, some of the candidate data subsets can be combined. The query processing device 102 selects at least two of the candidate data subsets at 820, and combines the selected candidate data subsets into one candidate data subset at 830. The combined candidate data subset covers source dimensions of the at least two candidate data subsets. For example, two candidate data subsets having source dimensions {A, B} and {B, C} are selected and combined to obtain a combined candidate data subset {A, B, C}. In some implementations, the query processing device 102 can randomly select some of the candidate data subsets. In some other implementations, candidate data subsets having small data volumes (sizes) are selected. Selecting and combining candidate data subsets with small sizes is to avoid the size of the combined candidate data subset grows too rapidly. Estimation on a data size of a candidate data subset will be described in detail below.

A higher dimensional coverage can be achieved by the combined candidate data subset. To avoid redundancy, the query processing device 102 identifies one or more candidate data subsets with source dimensions covered by the combined candidate data subset at 840. The identified candidate data subset(s) can be discarded or eliminated from the following operations. For example, if the candidate data subsets having source dimensions {A, B} and {B, C} are selected at 820 and combined at 830 to obtain a candidate data subset {A, B, C}, candidate data subsets {A, B} and {B, C} are discarded at 840 because their dimensions have been covered by the combined candidate data subset {A, B, C}. The discarded subsets may not be limited to the candidate data subsets used for combination because the combined candidate data subset can also encompass other dimension combinations. For example, if two candidate data subsets involving {A, B, D} and {B, C} are selected at 820 and combined at 830, in addition the two candidate data subsets, other candidate data subsets with dimension combinations {A, B}, {A, D}, {A, C}, {B, D}, {A, B, C}, {A, C, D} and {B, C, D}(if any) may also be discarded at 840.

Based on the remaining candidate data subsets (including the combined candidate data subset) other than the identified candidate data subset(s), data subsets to be stored in the accessible storage device 130 of the query processing device 102 are determined. In some implementations, in order to meet the storage limit, the query processing device 102 determines at 850 whether a total data size of the remaining candidate data subsets exceeds the available storage space. The available storage space here refers to the storage space available in the storage device into which the query processing device 102 will store the data subsets. The total data size of the remaining candidate data subsets is computed based on a data size of each candidate data subset, which will be described in details below.

If the total data size of the remaining candidate data subsets is determined as within the limit of the available storage space, for example, the total data size is equal or smaller than the limit of the available storage space, the query processing device 102 determines the remaining candidate data subsets as data subsets of the query processing device 102 at 860. At this time, the data subsets can be generated from the source data set based on the source dimensions covered by the remaining candidate data subsets.

If the total data size of the remaining candidate data subsets is determined as exceeding the limit of the available storage space, the process 800 returns to 820 to continue selecting data subsets for combination. The selection can be made from the remaining candidate data sets that are not discarded previously (including the previously combined candidate data subset). The process 800 can be performed iteratively until the remaining candidate data subsets can be stored in the predetermined storage space.

The estimation on the data size of a candidate data subset is now discussed. The data size of a candidate data subset can be measured by the number of different data entries (also known as "distinct count") in that subset. The storage space occupied by storing the subset is determined by the number of different data entries. A different data entry indicates herein that data item(s) (dimension value(s)) of the data entry in one or more dimensions are different from other data entries. A simple method for determining the value of the distinct count is to directly analyze the data entries included in the source dimension covered by each candidate data set and to count the number of different data entries therein. However, the above method is quite time-consuming.

In some implementations, that number can be estimated by sampling data entries to be included in the certain candidate data subset for the sake of efficiency. Specifically, for a given candidate data subset, a plurality of data entries can be sampled from the data entries included therein. If the candidate data subset has not been actually generated, samples are taken from the source data set. A first number of different data entries and a second number of data entries having a frequency of occurrence lower than a threshold frequency can be determined from the sampled data entries.

The number of sampled data entries having a low frequency of occurrence is considered here because this number can reflect, to a great extent, the variation degree of data entries in the candidate data subset. In some examples, the threshold frequency can be one. Therefore, the second number is determined as the number of data entries that only appear once in the sampled data entries. The threshold frequency can also be determined as any other small value such as two or three in other examples.

The number of different data entries included in the candidate data subset can be positively correlated with the first number and the second number. If both the number of different data entries and the number of data entries with a lower frequency of occurrence in the sampled data entries are great numbers, the number of different data entries included in the candidate data subset is also large. An example of determining the number of different data entries in the candidate data subset is provided below. In this example, it is supposed that the total number of data entries in a given candidate data subset is N, and S data entries are sampled from this subset. Through statistics, it is determined that in the S data entries, there are u1 different data entries and u2 data entries with a frequency of occurrence lower than the threshold frequency. The number of different data entries U in the candidate data subset is calculated as follows.

$$U = u_1 + u_2 * \sqrt{\left(\frac{u_2}{|S|} - |S|\right)/|S|} \quad (4)$$

It would be appreciated that only a specific example is provided above for determining the number U through the first and second numbers u1 and u2. There are many other methods can also be used to calculate the number U based on the numbers u1 and u2, as long as the methods can reflect the positive correlation relationship between the numbers. For instance, to compute U, u1 and u2 are can be weighted respectively and then is multiplied by S.

In some examples, the number of different data entries in each candidate data subset can be used as a metric for the data size, which is then compared with the data size threshold with the same metric to select the candidate data subsets to be combined. When it is needed to determine the total data size of multiple candidate data subsets (for example, at 850), since the total data size is to be compared with the available storage space, the storage space to be occupied by each of the candidate data subsets can be estimated based on the number of different data entries in the candidate data subset and then used to calculate the total storage space occupied by all the candidate data subsets. In some examples, the size of the occupied storage space is positively correlated with the number of different data entries. In addition, the storage space occupied by a candidate data subset may be determined further based on the type and the number of source dimensions covered by the candidate data subset.

In accordance with implementations of the subject matter described herein, there is provided a method of determining a query result for a query as accurately as possible based on the available data subsets during the query processing of data analysis. No prior knowledge of the source data distribution or historical workloads is required in the method. In addition, it is also possible to avoid time consumption on analyzing the source data sets offline, thereby achieving faster query processing. In addition, a new solution of generating data subsets from a source data set is also proposed in the subject matter described herein. In generating data subsets, this solution enables the generated data subsets to have small data sizes and to cover more dimension combinations under a given constraint of storage space. Moreover, the dimension combinations covered by the data subsets can be automatically adapted to provide query results in a more prompt and accurate way and the requirement of calculating correlations during query estimate can also be satisfied.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some exemplary implementations of the subject matter described herein are listed below.

In one aspect, a computer-implemented method is provided in the present disclosure described herein. The method includes: receiving a query including a plurality of query items associated with a plurality of target dimensions of a data entry; determining whether at least two of a plurality of data subsets are needed to cover the plurality of target dimensions, at least one of the plurality of data subsets including data entries corresponding to at least one of the plurality of target dimensions; in response to determining that the at least two of the plurality of data subsets are needed to cover the plurality of target dimensions, decomposing the query into a plurality of subqueries, each of the plurality of subqueries having at least one of the plurality of query items; and determining a query result for the query by analyzing a data entry in the plurality of data subsets that is corresponding to a target dimension associated with the at least one query item in each of the plurality of subqueries.

In some implementations, decomposing the query into a plurality of subqueries includes: determining correlations between respective pairs of query items among the plurality of query items; determining associations of the plurality of target dimensions based on the target dimensions corresponding to the respective data subsets and the correlations; and decomposing, based on the determined associations, the query into the plurality of subqueries such that target dimensions corresponding to a subquery having a plurality of query items are determined as having an association.

In some implementations, determining correlations between respective pairs of query items includes: determining mutual information between the respective pairs of query items based on probabilities of presence of the plurality of query items in corresponding target dimensions.

In some implementations, determining associations of the plurality of target dimensions comprises: determining two of the plurality of target dimensions as having an association based on at least one of a correlation between a pair of query items associated with the two target dimensions being greater than a threshold correlation; the two target dimensions being covered by a first data subset of the plurality of data subsets; and the two target dimensions and a further target dimension having an association with one of the two target dimensions being covered by a second data subset of the plurality of data subsets.

In some implementations, the method further includes: creating a plurality of candidate data subsets from a source data set based on a predetermined coverage rate for combinations of source dimensions of the source data set, each of the plurality of candidate data subsets covering at least two of the plurality of source dimensions; combining at least two of the plurality of candidate data subsets into a candidate data subset such that the combined candidate data subset covers source dimensions of the at least two candidate data subsets; identifying, from the plurality of candidate data subsets, a candidate data subset with source dimensions covered by the combined candidate data subset; and determining the plurality of data subsets based on remaining candidate data subsets other than the identified candidate data subset.

In some implementations, the method further includes selecting the at least two candidate data subsets by: determining a data size of each of the plurality of candidate data subsets; and selecting, from the plurality of candidate data subsets, the at least two candidate data subsets with respective data sizes smaller than a threshold data size.

In some implementations, determining a data size of each of the plurality of candidate data subset includes: sampling a plurality of data entries from data entries included in a given candidate data subset; determining a first number of different data entries and a second number of data entries having a frequency of occurrence lower than a threshold frequency among the sampled plurality of data entries; determining, based on the first number and the second number, the number of different data entries included in the given candidate data subset; and determining, based on the number of the different data entries, the data size of the given candidate data subset.

In some implementations, determining the plurality of data subsets based on the remaining candidate data subsets includes: determining whether a total data size of the remaining candidate data subsets exceeds a storage space available for storing the plurality of data subsets; and in response to the total data size being equal to or smaller than the storage space, determining the remaining candidate data subsets as the plurality of data subsets.

In some implementations, the plurality of data subsets are stored in a fast access storage device.

In another aspect, a device is provided in the present disclosure described herein. The device includes a processing unit; a memory coupled to the processing unit and storing instructions thereon, the instructions, when executed by the processing unit, performing acts including: receiving a query including a plurality of query items associated with a plurality of target dimensions of a data entry; determining whether at least two of a plurality of data subsets are needed to cover the plurality of target dimensions, at least one of the plurality of data subsets including data entries corresponding to at least one of the plurality of target dimensions; in response to determining that the at least two of the plurality of data subsets are needed to cover the plurality of target dimensions, decomposing the query into a plurality of subqueries, each of the plurality of subqueries having at least one of the plurality of query items; and determining a query result for the query by analyzing a data entry in the plurality of data subsets that is corresponding to a target dimension associated with the at least one query item in each of the plurality of subqueries.

In some implementations, decomposing the query into a plurality of subqueries includes: determining correlations between respective pairs of query items among the plurality of query items; determining associations of the plurality of target dimensions based on the target dimensions corresponding to the respective data subsets and the correlations; and decomposing, based on the determined associations, the query into the plurality of subqueries such that target dimensions corresponding to a subquery having a plurality of query items are determined as having an association.

In some implementations, determining correlations between respective pairs of query items includes: determining mutual information between respective pairs of query items based on probabilities of presence of the plurality of query items in corresponding target dimensions.

In some implementations, determining association of the plurality of target dimensions includes: determining two of the plurality of target dimensions as having an association based on at least one of a correlation between a pair of query items associated with the two target dimensions being greater than threshold correlation; the two target dimensions being covered by a first data subset of the plurality of data subsets; and the two target dimensions and a further target dimension having an association with one of the two target dimensions being covered by a second data subset of the plurality of data subsets.

In some implementations, the actions further include: creating a plurality of candidate data subsets from a source data set based on a predetermined coverage rate for combinations of source dimension of the source data set, each of the plurality of candidate data subsets covering at least two of the plurality of source dimensions; combining at least two of the plurality of candidate data subsets into a candidate data subset such that the combined candidate data subset covers source dimensions of the at least two candidate data subsets; identifying, from the plurality of candidate data subsets, a candidate data subset with source dimensions covered by the combined candidate data subset; and determining the plurality of data subsets based on remaining candidate data subsets other than the identified candidate data subset.

In some implementations, the actions further include selecting the at least two candidate data subsets by: determining a data size of each of the plurality of candidate data subsets; and selecting, from the plurality of candidate data subsets, the at least two candidate data subsets with respective data sizes smaller than a threshold data size.

In some implementations, determining a data size of each of the plurality of candidate data subsets includes: sampling a plurality of data entries from data entries included in a given candidate data subset; determining a first number of different data entries and a second number of data entries having a frequency of occurrence lower than a threshold frequency among the sampled plurality of data entries; determining, based on the first number and the second number, the number of different data entries included in the given candidate data subset; and determining, based on the number of the different data entries, the data size of the given candidate data subset.

In some implementations, determining the plurality of data subsets based on the remaining candidate data subsets includes: determining whether a total data size of the remaining candidate data subsets exceeds a storage space available for storing the plurality of data subsets; and in response to the total data size being smaller or equal to the storage space, determining the remaining candidate data subsets as the plurality of data subsets.

In some implementations, the plurality of data subsets are stored in a fast access storage device.

In a further aspect, a computer program product is provided in the present disclosure described herein. The computer program product is stored on a non-transitory computer storage medium and comprises machine-executable instructions, the machine-executable instructions, when executed on a device, causing the device to: receive a query including a plurality of query items associated with a plurality of target dimensions of a data entry; determine whether at least two of a plurality of data subsets are needed to cover the plurality of target dimensions, at least one of the plurality of data subsets including data entries corresponding to at least one of the plurality of target dimensions; in response to determining that the at least two of the plurality of data subsets are needed to cover the plurality of target dimensions, decompose the query into a plurality of subqueries, each of the plurality of subqueries having at least one of the plurality of query items; and determine a query result for the query by analyzing a data entry in the plurality of data subsets that is corresponding to a target dimension associated with the at least one query item in each of the plurality of subqueries.

In some implementations, the machine-executable instructions, when executed on the device, cause the device to: determine correlations between respective pairs of query items among the plurality of query items; determine associations of the plurality of target dimensions based on the target dimensions corresponding to the respective data subsets and the correlations; and decompose, based on the determined associations, the query into the plurality of subqueries such that target dimensions corresponding to a subquery having a plurality of query items are determined as having an association.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A computer-implemented method, comprising:
   receiving a query including a plurality of query items associated with a plurality of target dimensions of a data entry;
   determining at least two of a plurality of data subsets are needed to cover the plurality of target dimensions, at least one of the plurality of data subsets including data entries corresponding to at least one of the plurality of target dimensions;
   in response to determining that the at least two of the plurality of data subsets are needed to cover the plurality of target dimensions, decomposing the query into a plurality of subqueries, each of the plurality of subqueries having at least one of the plurality of query items, wherein decomposing the query into the plurality of sub queries comprises:
      determining correlations between respective pairs of query items among the plurality of query items, wherein determining the correlations comprises determining mutual information between the respective pairs of query items based on probabilities of presence of the plurality of query items in corresponding target dimensions; and
      determining associations of the plurality of target dimensions based on the plurality of target dimensions corresponding to the respective data subsets and the correlations; and
   determining a query result for the query by analyzing a data entry in the plurality of data subsets that is corresponding to a target dimension associated with the at least one query item in each of the plurality of subqueries.

2. The method of claim 1, wherein decomposing the query into the plurality of sub queries further comprises:
   decomposing, based on the determined associations of the plurality of target dimensions, the query into the plurality of subqueries such that target dimensions corresponding to a subquery having one or more of the plurality of query items are determined as having an association.

3. The method of claim 1, wherein determining the associations of the plurality of target dimensions comprises:
   determining two of the plurality of target dimensions as having an association based on at least one of:
      a correlation between a pair of query items associated with the two target dimensions being greater than a threshold correlation;
      the two target dimensions being covered by a first data subset of the plurality of data subsets; and
      the two target dimensions and a further target dimension having an association with one of the two target dimensions being covered by a second data subset of the plurality of data subsets.

4. The method of claim 1, further comprising:
creating a plurality of candidate data subsets from a source data set based on a predetermined coverage rate for combinations of source dimensions of the source data set, each of the plurality of candidate data subsets covering at least two of the source dimensions;
combining at least two of the plurality of candidate data subsets into a combined candidate data subset such that the combined candidate data subset covers source dimensions of the at least two candidate data subsets;
identifying, from the plurality of candidate data subsets, a candidate data subset with source dimensions covered by the combined candidate data subset; and
determining the plurality of data subsets based on remaining candidate data subsets other than the identified candidate data subset.

5. The method of claim 4, further comprising selecting the at least two candidate data subsets by:
determining a data size of each of the plurality of candidate data subsets; and
selecting, from the plurality of candidate data subsets, the at least two candidate data subsets with respective data sizes smaller than a threshold data size.

6. The method of claim 5, wherein determining the data size of each of the plurality of candidate data subsets comprises:
sampling a plurality of data entries from data entries included in a given candidate data subset;
determining a first number of different data entries and a second number of data entries having a frequency of occurrence lower than a threshold frequency among the sampled plurality of data entries;
determining, based on the first number and the second number, a number of different data entries included in the given candidate data subset; and
determining, based on the number of the different data entries, the data size of the given candidate data subset.

7. The method of claim 4, wherein determining the plurality of data subsets based on the remaining candidate data subsets comprises:
determining whether a total data size of the remaining candidate data subsets exceeds a storage space available for storing the plurality of data subsets; and
in response to the total data size being equal to or smaller than the storage space, determining the remaining candidate data subsets as the plurality of data subsets.

8. A device, comprising:
a processing unit;
a memory coupled to the processing unit and storing instructions thereon, the instructions, when executed by the processing unit, cause the processing unit to:
receive a query including a plurality of query items associated with a plurality of target dimensions of a data entry;
determine whether at least two of a plurality of data subsets are needed to cover the plurality of target dimensions, at least one of the plurality of data subsets including data entries corresponding to at least one of the plurality of target dimensions;
in response to determining that the at least two of the plurality of data subsets are needed to cover the plurality of target dimensions, decompose the query into a plurality of subqueries, each of the plurality of subqueries having at least one of the plurality of query items, wherein decomposing the query into the plurality of subqueries comprises:
determine correlations between respective pairs of query items among the plurality of query items, wherein determining the correlations comprises determining mutual information between the respective pairs of query items based on probabilities of presence of the plurality of query items in corresponding target dimensions; and
determine associations of the plurality of target dimensions based on the plurality of target dimensions corresponding to the respective data subsets and the correlations; and
determine a query result for the query by analyzing a data entry in the plurality of data subsets that is corresponding to a target dimension associated with the at least one query item in each of the plurality of subqueries.

9. The device of claim 8, wherein, to decompose the query into the plurality of subqueries, the processing unit is further caused to:
decompose, based on the determined associations of the plurality of target dimensions, the query into the plurality of subqueries such that target dimensions corresponding to a subquery having one or more of the plurality of query items are determined as having an association.

10. The device of claim 8, wherein, to determine the association of the plurality of target dimensions, the processing unit is caused to:
determining two of the plurality of target dimensions as having an association based on at least one of:
a correlation between a pair of query items associated with the two target dimensions being greater than threshold correlation;
the two target dimensions being covered by a first data subset of the plurality of data subsets; and
the two target dimensions and a further target dimension having an association with one of the two target dimensions being covered by a second data subset of the plurality of data subsets.

11. The device of claim 8, wherein the processing unit is further caused to:
create a plurality of candidate data subsets from a source data set based on a predetermined coverage rate for combinations of source dimensions of the source data set, each of the plurality of candidate data subsets covering at least two of the source dimensions;
combine at least two of the plurality of candidate data subsets into a combined candidate data subset such that the combined candidate data subset covers source dimensions of the at least two candidate data subsets;
identify, from the plurality of candidate data subsets, a candidate data subset with source dimensions covered by the combined candidate data subset; and
determine the plurality of data subsets based on remaining candidate data subsets other than the identified candidate data subset.

12. The device of claim 11, wherein the processing unit is further caused to select the at least two candidate data subsets by:
determining a data size of each of the plurality of candidate data subsets; and
selecting, from the plurality of candidate data subsets, the at least two candidate data subsets with respective data sizes smaller than a threshold data size.

13. The device of claim 12, wherein, to determine the data size of each of the plurality of candidate data subsets, the processing unit is caused to:

sample a plurality of data entries from data entries included in a given candidate data subset;

determine a first number of different data entries and a second number of data entries having a frequency of occurrence lower than a threshold frequency among the sampled plurality of data entries;

determine, based on the first number and the second number, a number of different data entries included in the given candidate data subset; and determine, based on the number of the different data entries, the data size of the given candidate data subset.

14. The device of claim 11, wherein, to determine the plurality of data subsets based on the remaining candidate data subsets, the processing unit is caused to:

determine whether a total data size of the remaining candidate data subsets exceeds a storage space available for storing the plurality of data subsets; and in response to the total data size being equal to or smaller than the storage space, determine the remaining candidate data subsets as the plurality of data subsets.

15. A non-transitory computer storage medium with computer-executable instructions stored thereon, the instructions comprising:

receiving a query including a plurality of query items associated with a plurality of target dimensions of a data entry;

determining whether at least two of a plurality of data subsets are needed to cover the plurality of target dimensions, at least one of the plurality of data subsets including data entries corresponding to at least one of the plurality of target dimensions;

in response to determining that the at least two of the plurality of data subsets are needed to cover the plurality of target dimensions, decomposing the query into a plurality of subqueries, each of the plurality of subqueries having at least one of the plurality of query items, wherein decomposing the query into the plurality of sub queries comprises:

determining correlations between respective pairs of query items among the plurality of query items, wherein determining the correlations comprises determining mutual information between the respective pairs of query items based on probabilities of presence of the plurality of query items in corresponding target dimensions; and determining associations of the plurality of target dimensions based on the plurality of target dimensions corresponding to the respective data subsets and the correlations; and determining a query result for the query by analyzing a data entry in the plurality of data subsets that is corresponding to a target dimension associated with the at least one query item in each of the plurality of subqueries.

16. The non-transitory computer storage medium of claim 15, wherein decomposing the query into the plurality of subqueries further comprises:

decomposing, based on the determined associations, the query into the plurality of subqueries such that target dimensions corresponding to a subquery having one or more of the plurality of query items are determined as having an association.

17. The non-transitory computer storage medium of claim 15, the instructions further comprising:

creating a plurality of candidate data subsets from a source data set based on a predetermined coverage rate for combinations of source dimensions of the source data set, each of the plurality of candidate data subsets covering at least two of the source dimensions;

combining at least two of the plurality of candidate data subsets into a combined candidate data subset such that the combined candidate data subset covers source dimensions of the at least two candidate data subsets;

identifying, from the plurality of candidate data subsets, a candidate data subset with source dimensions covered by the combined candidate data subset; and determining the plurality of data subsets based on remaining candidate data subsets other than the identified candidate data subset.

18. The non-transitory computer storage medium of claim 17, wherein the at least two candidate data subsets are selected by:

determining a data size of each of the plurality of candidate data subsets; and selecting, from the plurality of candidate data subsets, the at least two candidate data subsets with respective data sizes smaller than a threshold data size.

19. The non-transitory computer storage medium of claim 15, wherein determining the data size of each of the plurality of candidate data subsets comprises:

sampling a plurality of data entries from data entries included in a given candidate data subset;

determining a first number of different data entries and a second number of data entries having a frequency of occurrence lower than a threshold frequency among the sampled plurality of data entries;

determining, based on the first number and the second number, a number of different data entries included in the given candidate data subset; and determining, based on the number of the different data entries, the data size of the given candidate data subset.

20. The non-transitory computer storage medium of claim 15, wherein determining the associations of the plurality of target dimensions comprises:

determining two of the plurality of target dimensions as having an association based on at least one of:

a correlation between a pair of query items associated with the two target dimensions being greater than a threshold correlation;

the two target dimensions being covered by a first data subset of the plurality of data subsets; and the two target dimensions and a further target dimension having an association with one of the two target dimensions being covered by a second data subset of the plurality of data subsets.

* * * * *